(12) United States Patent
Aydin et al.

(10) Patent No.: US 11,381,978 B2
(45) Date of Patent: Jul. 5, 2022

(54) METHOD AND DEVICE FOR ALLOCATING RADIO RESOURCES IN A RADIO COMMUNICATION SYSTEM

(71) Applicant: Alcatel Lucent, Boulogne-Billancourt (FR)

(72) Inventors: Osman Aydin, Stuttgart (DE); Danish Aziz, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 16/335,781

(22) PCT Filed: Sep. 19, 2017

(86) PCT No.: PCT/EP2017/073603
§ 371 (c)(1),
(2) Date: Mar. 22, 2019

(87) PCT Pub. No.: WO2018/054890
PCT Pub. Date: Mar. 29, 2018

(65) Prior Publication Data
US 2019/0253896 A1    Aug. 15, 2019

(30) Foreign Application Priority Data

Sep. 23, 2016 (EP) .................................... 16306227

(51) Int. Cl.
*H04W 16/14* (2009.01)
*H04W 72/04* (2009.01)
*H04W 16/10* (2009.01)

(52) U.S. Cl.
CPC ....... *H04W 16/14* (2013.01); *H04W 72/0413* (2013.01); *H04W 16/10* (2013.01); *H04W 72/042* (2013.01); *H04W 72/0446* (2013.01)

(58) Field of Classification Search
CPC . H04W 16/14; H04W 72/0413; H04W 16/10; H04W 72/042; H04W 72/0446
See application file for complete search history.

(56) References Cited

U.S. PATENT DOCUMENTS

| | | |
|---|---|---|
| 2011/0188481 A1 | 8/2011 | Damnjanovic et al. |
| 2012/0304212 A1 | 11/2012 | Lee et al. |
| (Continued) | | |

FOREIGN PATENT DOCUMENTS

| | | |
|---|---|---|
| EP | 2 854 436 A1 | 4/2015 |
| JP | 2016506194 A | 2/2016 |
| (Continued) | | |

OTHER PUBLICATIONS

3GPP TS 36.300 V13.2.0 (Dec. 2015), "3rd Generation Partnership Project; Technical specification Group Radio Access Network; Evolved Universal Terrestrial Radio Access (E-UTRA) and Evolved Universal Terrestrial Radio Access Network (E-UTRAN); Overall description; Stage 2 (Release 13)", 290 pgs.

(Continued)

*Primary Examiner* — Omer S Mian
(74) *Attorney, Agent, or Firm* — Harrington & Smith

(57) ABSTRACT

Method and device for allocating resources in a radio communication system providing resources for uplink transmission and/or for downlink transmission for a plurality of operators providing a service to a user equipment via the radio communication system, wherein the device includes a processor, memory and a transceiver, the processor being adapted to select a time division duplex configuration having an allocation of uplink transmission time and/or an allocation of downlink transmission time based on information regarding a sharing characteristic for the radio resources defined by a service level agreement between operators sharing the radio resources.

15 Claims, 2 Drawing Sheets

(56) References Cited

U.S. PATENT DOCUMENTS

| | | | |
|---|---|---|---|
| 2014/0355567 A1 | 12/2014 | Irmer et al. | 370/331 |
| 2015/0223113 A1* | 8/2015 | Matsunaga | H04W 52/343 |
| | | | 370/236 |
| 2015/0351108 A1 | 12/2015 | Cui et al. | |
| 2017/0339567 A1* | 11/2017 | Li | H04W 16/02 |
| 2019/0174498 A1* | 6/2019 | Samdanis | H04W 72/0453 |

FOREIGN PATENT DOCUMENTS

| | | |
|---|---|---|
| KR | 101425126 B1 | 8/2014 |
| WO | WO-2012/057584 A2 | 5/2012 |

OTHER PUBLICATIONS

Shrivastava, R., et al., "An SDN-based Framework for Elastic Resource Sharing in Integrated FDD/TDD LTE-A HetNets", 2014 IEEE 3$^{rd}$ International Conference on Cloud Networking (CloudNet), 6 pgs.

Aydin, O., "A Two-Step Scheduler for Dynamically Sharing Wireless Channel Resources among Operators", 2013 IEEE 77$^{th}$ Vehicular technology Conference, abstract.

Lopez-Perez, David, et al., "On Dynamic Time-Division-Duplex Transmissions for Small-Cell Networks", 2016 IEEE Transactions on Vehicular Technology, abstract.

Nokia Solutions and Networks Smart Labs, "Understanding Smartphone Behavior in the Network", NSN White Paper, Nov. 2013, 9 pgs.

* cited by examiner

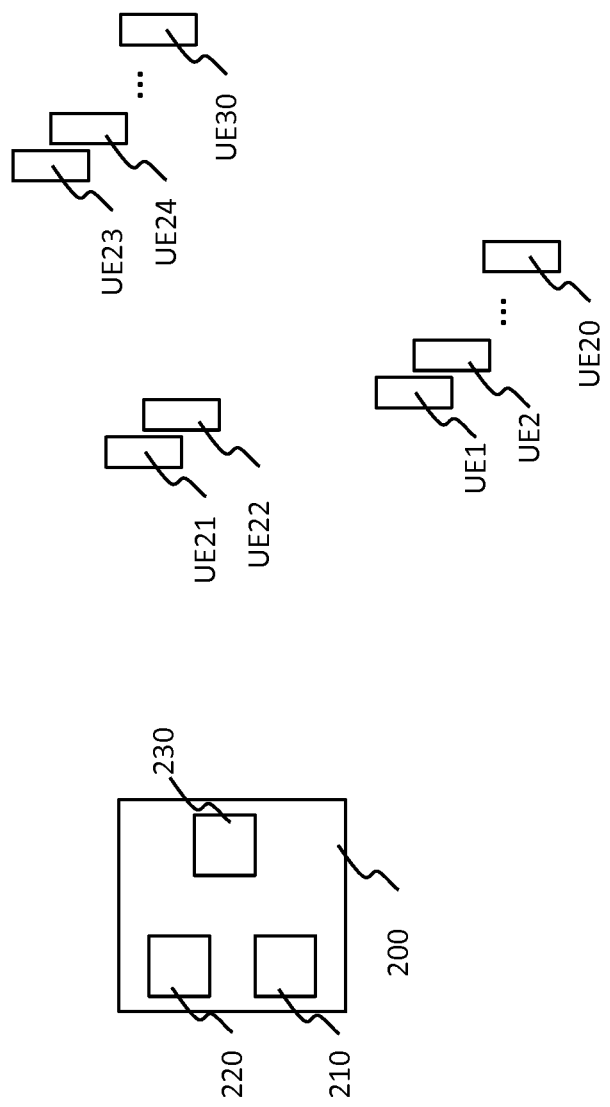

METHOD AND DEVICE FOR ALLOCATING RADIO RESOURCES IN A RADIO COMMUNICATION SYSTEM

CROSS REFERENCE TO RELATED APPLICATION

This patent application is a U.S. National Stage application of International Patent Application Number PCT/EP2017/073603 filed Sep. 19, 2017, which is hereby incorporated by reference in its entirety, and claims priority to EP 16306227.6 filed Sep. 23, 2016.

FIELD OF THE INVENTION

Embodiments relate to a method and a device for allocating radio resources in a radio communication system.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Sharing the wireless channel resource and Base Station, BS, hardware, is a new paradigm for wireless network operators to reduce the costs of operation and deployment. Especially in low-traffic scenarios or with expensive macrocells, sharing allows multiple operators to utilize the BS and frequency spectrum more efficiently. To do so, operators and infrastructure providers agree on the guarantees of quality of service and fairness with the help of service level agreements, SLAs, that define sharing characteristics such as data rates, throughput, jitter or similar measurable details regarding the wireless channel resource or BS hardware.

In a technical implementation, the SLAs including the relevant parameters are for example managed by an SLA Manager, SLAM. An SLAM is for example realized as a physical or a virtual functional entity, functional unit or functional module. The SLAM is for example hosted on a server or on distributed servers operated by a third party or by an operator of a shared mobile network. The SLAM could be located within shared mobile network, e.g. in the mobile edge cloud, the radio access network, RAN, edge cloud or in the core network. The SLAM could be located in an external network supporting the shared mobile network. The SLAM could have an interface to a shared base station. In case of a central unit managing a cluster of shared base stations, the SLAM could have an interface to that central unit. In case of a shared radio access network, the SLAM could have an interface to the radio access network controller or mobile edge cloud. This interface could be realized using a logical connection via multiple entities, e.g. Radio Network Controllers or a Mobility Management Entity or a physical connection.

In traditional frequency division duplex, FDD, approaches, the fulfillment of the SLAs is guaranteed over a certain time window. Scheduling approaches to guarantee the SLAs in multiple operator sharing, MO sharing, scenarios have been described for example in O. Aydin, W. Jamil, and S. Valentin, "A two-step scheduler for the dynamic sharing of wireless channel resource among operators," in Proc. Vehicular Technology Conf. VTC-Spring, June 2013, and I. Malanchini, S. Valentin, O. Aydin, Generalized resource sharing for multiple operators in cellular wireless networks, in: Proc. Int. Wireless Commun. And Mobile Computing Conf. (IWCMC), 2014.

The time division duplex, TDD, systems offer a range of configurations with respect to the uplink, UL, and downlink, DL, transmission times. These configurations are selected either in a semi-static way as described in 3GPP TS 36.300 V13.2.0 or in a dynamic way as described in David et. al, "On Dynamic Time Division Duplex Transmissions for Small Cell Networks", Vehicular Technology, IEEE Transactions on (Volume: PP, Issue: 99) or Nokia Solutions and Networks TD-LTE Frame Configuration Primer, NSN White paper November 2013. The selection for example is made depending upon the UL/DL traffic demand or UL/DL traffic asymmetry. In the presence of multiple operators, there is no provision that allows the selection of TDD configuration in accordance with the SLAs. In particular, there is no guarantee for complying with SLAs which require fairness between operators with respect to the allocation of UL and DL transmission radio resources, e.g. with respect to time, frequency, space, transmission power, etc.

SUMMARY

It is an objective of the present invention to provide methods, devices and computer programs for coordination of inter-operator spectrum sharing and adaptive spectrum sharing among distributed Radio Access Networks RANs of different operators. The invention applies for example to a standalone base station as well as to a central unit serving a cluster containing at least one base station.

Regarding the abovementioned method, this objective is achieved by allocating resources in a time division duplex radio communication system providing resources for uplink transmission and/or for downlink transmission for a plurality of operators providing a service to a user equipment via the radio communication system, wherein a time division duplex configuration having an according allocation of uplink transmission time and/or an according allocation of downlink transmission time is selected based on information regarding a sharing characteristic for the radio resources defined by a service level agreement between operators sharing the radio resources. The service level agreement provides sharing parameters for the sharing characteristic defining the allocation of uplink transmission time and/or the allocation of downlink transmission time. The parameters are based on the agreed sharing principles of radio resources and/or network resources as well as the quality of service requirements of each operator. The sharing parameters define for example as one of the sharing principles how the quality of service levels regarding radio resources allocated to each participating operator relate. According to another sharing principle an absolute value for providing quality of service may be allocated to each participating operator using the sharing parameters. According to yet another sharing principle a ratio of radio and/or network resources between participating operators may be defined in the sharing parameters, where the actual ratio may be dependent on predetermined circumstances and/or conditions.

Preferably the uplink allocation and/or the downlink allocation according to the time division duplex configuration reflects the sharing parameters regarding a resource split between the operators.

Preferably the selection is made dynamically or semi-statically. Requirements may change over time when multiple user equipments of different operators with different service level agreements are connecting to a base station. Using a dynamic or semi-static adaptation is faster than using a static configuration.

Preferably the selection is made after a predetermined number of transmission time intervals, TTI, passed since the last selection. This way the changes are made in a deterministic way.

Preferably the selection is deterministic. This allows removing uncertainty and guarantees that a service level agreement is fulfilled.

Preferably, at least one specific subframe of a time division duplex frame in the time division duplex configuration is assigned to a specific operator. This provides deterministic correlation of operator to content of the time division duplex subframe. The subframe may be used as a transmission slot in the uplink or the downlink.

Preferably, at least one transmission slot in a time division duplex configuration is configured to be scheduled for at least one user equipment of at least one operator considering the service level agreement of the at least one operator. This way the SLA requirement of the at least one operator is considered.

Preferably, the configuration of at least one transmission slot in a time division duplex configuration considers the number of active user equipment per operator in a radio cell. This way the radio load of different operators in the radio cell is considered.

Preferably the information regarding the sharing characteristic for the radio resources is received in particular by a sharing base station or a central unit controlling at least one shared base station. The information regarding the sharing characteristic is for example received via a base station control function, BCF. The BCF for example provides an operations and maintenance, O&M, connection to a network management system NMS. The sharing base station or the central unit operates as a service level agreement manager, SLAM. The time division duplex configuration is determined by the SLAM based on the received information regarding the sharing characteristic for the radio resource. The information for allocation of uplink transmission time and/or an allocation of downlink transmission time is selected based on the time division duplex configuration. The information for an allocation of uplink transmission time and/or an allocation of downlink transmission time is processed at a unit providing corresponding uplink and/or downlink radio resource. This way the time divisional duplex configuration may be evaluated by the BS or the central unit.

Regarding the abovementioned device, this objective is achieved by allocating resources in a time division duplex radio communication system providing resources for uplink transmission and/or for downlink transmission for a plurality of operators providing a service to a user equipment via the radio communication system, wherein the device comprises a processor, memory and a transceiver, wherein the processor is adapted to select an allocation of uplink transmission time, an allocation of downlink transmission time and/or a time division duplex configuration according to information regarding a sharing characteristic for the radio resources defined by a service level agreement between operators sharing the radio resources.

Preferably the device is adapted to receive the information regarding the sharing characteristic for the radio resources, determine the time division duplex configuration based on the received information regarding the sharing characteristic for the radio resources, select information for an allocation of uplink transmission time and/or an allocation of downlink transmission time based on the time division duplex configuration. This way sharing parameters are sent from the SLAM to a BS or central unit. The time divisional duplex configuration may be evaluated at the BS or the central unit.

In some embodiments, the device is adapted to send information for an allocation of uplink transmission time and/or an allocation of downlink transmission time for processing at a unit providing corresponding uplink and/or downlink radio resources. The device may be a central unit for controlling one BS or a cluster of BS respectively. This provides a hierarchical structure of the network.

In some other embodiments, the device is adapted to process information for an allocation of uplink transmission time and/or an allocation of downlink transmission time, and provide corresponding uplink and/or downlink radio resources. This provides a flat structure of the network.

In both, flat or hierarchical structure of the network, this adaptive uplink and/or downlink time division duplex configuration is signaled to any user equipment by self-contained control information within a time division duplex subframe or by using a separate control signaling method.

Further developments of the invention can be gathered from the dependent claims and the following description.

BRIEF DESCRIPTION OF THE FIGURES

Some other features or aspects will be described using the following non-limiting embodiments of devices or methods or computer programs or computer program products by way of example only, and with reference to the accompanying figures, in which.

DESCRIPTION OF THE EMBODIMENTS

Figure 1:
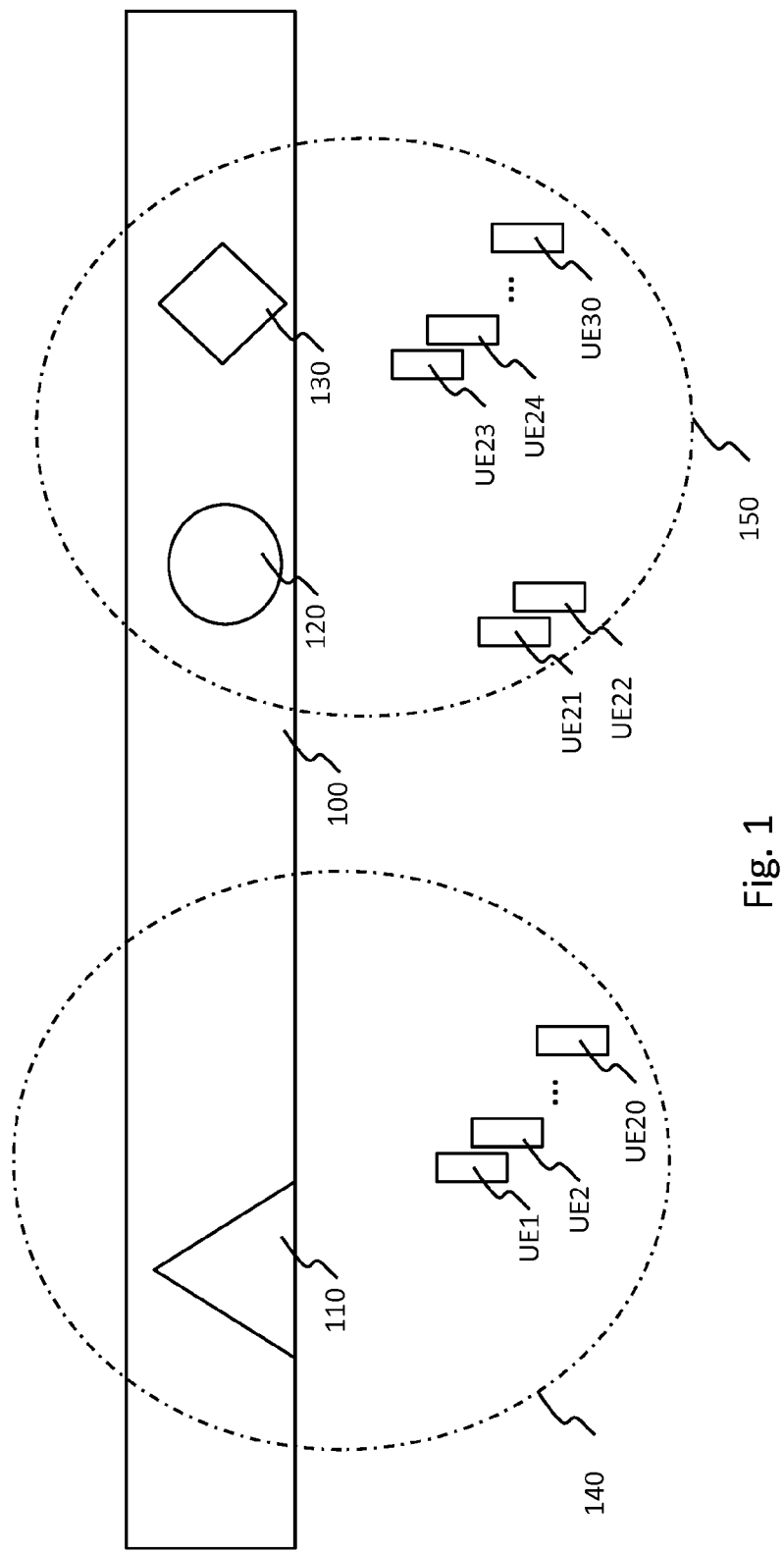
FIG. 1 schematically depicts parts of an allocation of resources in a time division duplex radio communication system providing corresponding resources, FIG. 2 schematically depicts parts of a time division duplex radio communication system.

Mobile communication systems, such as 3GPP Long Term Evolution or the like, use radio cells served by base stations, BS, to connect user equipment, UE, to a telecommunications network. Time division duplex, TDD is implemented to allow communication of BS and UE with one another in both directions. In the existing TDD systems, the selection of the TDD configuration is based on the ratio of uplink, UL, and downlink, DL, traffic in the radio cell as described for example in 3GPP, TR 36.828 V11.0.0. Dynamic TDD configurations consider for example interference coupling on the links. For deterministic allocation of resources in BS and UE control information slots, UL slots and DL slots are allocated in specific subframes of a TDD frame on the physical layer.

According to the embodiments described below, an allocation entity allocates the slots in subframes of TDD frames and a selection entity selects a TDD configuration to be used for allocation. Allocation and/or selection are for example semi-static. LTE TDD allows for asymmetric UL-DL allocations by providing seven different semi-statically configured uplink-downlink configurations. These allocations can provide between 40% and 90% DL subframes of TDD frames.

The semi-static allocation may or may not match the instantaneous traffic situation, therefore the allocation of subframes of TDD frames to UL or DL may be dynamic as well.

Additionally, according to the method described below, in a scenario where multiple operators are sharing the radio resource, the allocation entity and/or selection entity considers the conditions given in a service level agreement, SLA, between service providers and the operators of the shared resource.

Consequently UL or DL transmission time is allocated in subframes of the TDD frame depending on the SLA. In particular the selection of the TDD configuration is based on the SLA between the operators.

Preferably the TDD configuration and hence the UL/DL allocation reflects the agreed fairness ratios regarding the resource split between the operators. An example for a TDD configuration of two operators, an operator 1 and an operator 2, is depicted in Table 1 for TDD Frames having 10 subframes indicated by their subframe number index 0, . . . , 9:

TABLE 1

| Con-figuration | Switch Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D1 | S | U1 | U2 | U2 | D1 | S | U2 | U2 | U2 |
| 1 | 5 ms | D2 | S | U2 | U2 | D1 | D1 | S | U1 | U1 | D1 |
| 2 | 5 ms | D1 | S | U1 | D1 | D1 | D1 | S | U2 | D2 | D1 |
| 3 | 10 ms | D2 | S | U2 | U2 | U1 | D1 | D1 | D1 | D1 | D1 |
| 4 | 10 ms | D1 | S | U1 | U2 | D2 | D1 | D1 | D1 | D1 | D1 |
| 5 | 10 ms | D1 | S | U1 | D1 | D1 | D1 | D1 | D1 | D1 | D1 |
| 6 | 5 ms | D2 | S | U2 | U2 | U2 | D2 | S | U2 | U2 | D2 |

According to Table 1, seven different TDD configurations labelled by corresponding TDD indices 0, . . . , 6 in the first column of Table 1 contain different configurations for allocation of resources in corresponding subframes.

Configuration for control information slots are labelled "S". Configuration for uplink allocation is labelled "U"; configuration for downlink allocation is labelled "D". The operators are indicated with numeral "1" for operator 1 and numeral "2" for operator 2 accompanying the label for uplink or downlink.

In the example in configuration 0, only uplink subframes of the TDD frame are assigned to operator 2. In a LTE system, the uplink grants are transported in the physical downlink control channel, PDCCH. Using a DL subframe according to configuration 0 means in this example that the UEs of operator 2 never will get an uplink grant. If this is not desired, and no other mechanism is implemented beyond handling of grants on physical layer, each configuration of Table 1 may have at least one control information slot for UL and one control information slot for DL per operator. For configuration 0, this would result in the configuration of a TDD frame as depicted in Table 2:

TABLE 2

| Subframe Number | | | | | | | | | |
|---|---|---|---|---|---|---|---|---|---|
| 0 | 1 | 2 | 3 | 4 | 5 | 6 | 7 | 8 | 9 |
| D1 | S | U1 | U2 | D2 | D1 | S | U2 | U2 | U2 |

In other mobile communications networks, with respect to the grants, instead of transporting grants in the PDCCH and of using hybrid automatic repeat request, HARQ, acknowledgement, ACK, negative acknowledgement, NACK, there may be another control carrier or another control layer or a common control channel which communicates the grants or even ACK/NACKs.

For 5G systems a self-contained TDD subframe may be used in which one direction of DL or UL in the TDD configuration represents a main user data direction. The control information of ACK/NACKs for the other direction, i.e. UL or DL respectively, may still be in the same self-contained TDD subframe.

For short packets an asynchronous HARQ may be used as well.

In any case this exemplary configuration provides a deterministic allocation of resources to operators by assigning specific subframes of a TDD frame to a specific operator.

In an example it is assumed that the SLA for operator 2 is such that it requires radio resources in UL for a given interval 'T'. In this case, UL/DL allocation can be done as given in configuration 6 in Table 1. In other words, the configuration 6 in Table 1 can be selected by the serving radio cell every time interval T. This way the TDD configuration is selected deterministically.

Considering in another example, a scenario where two operators OP1 and OP2 are sharing the spectrum with a resource sharing ratio of 50% each. Assuming that data in DL buffers is available for a total of twenty active UEs UE1, . . . , UE20. From these twenty active UEs UE1, . . . , UE20, all are associated to OP1, there are no UEs associated to the OP2 in DL.

At the same time, there is data available in UL buffers of a total of ten active UEs UE21, . . . , UE30 from which two UEs UE21, UE 22 belong to OP1 and eight UEs UE23, . . . , UE30 belong to OP2.

This scenario is shown in FIG. 1, where transmission slots 100 for selected UEs are configured according to the TDD configuration 6 of Table 1. This means that three DL transmission slots 110 are allocated for OP1 in DL scheduling 140. One UL transmission slot 120 is allocated for OP1 and four UL transmission slots 130 are allocated for OP2 in uplink scheduling 150.

In order to fulfill the 50% radio resource share according to SLA, the TDD configuration 6 of Table 1 has been selected. This will allocate three DL and five UL transmission slots with (DL-OP1,DL-OP2)=(3,0) and (UL-OP1,UL-OP2)=(1,4).

TDD reconfiguration time, e.g. according to 3GPP, TR 36.828 provides fast reconfiguration intervals, e.g. 10 ms. Faster TDD UL-DL reconfiguration, where the selection of UL/DL slots is fully dynamic, provides a large benefit on average packet throughput compared to slow TDD UL-DL reconfiguration based on known TDD configurations. The method described above can be applied in both cases where the selection of UL/DL slots is fully dynamic or it is based on known TDD configurations.

Accordingly, transmission slots in the time division duplex configuration are configured to be scheduled for user equipment of operators considering the service level agreement of the respective operator. If more than one user equipment of a specific operator is present in a radio cell, preferably the configuration of transmission slots in the time division duplex configuration considers the number of active user equipment per operator in that radio cell. The radio load on a radio cell depends on the number of active user equipment in that radio cell. If user equipment of different operators is present in one radio cell, the service level agreement for a specific operator may define the share of available radio resources for all user equipment of this operator. In this particular case, all user equipment of that operator may share the radio resources available for that operator. In a simple approach this may be embodied by having the radio resources available to this operator being shared equally amongst the number of active user equipment of that operator.

Additionally a TDD configuration switching algorithm may comprise:
i: Switching between SLA based TDD configurations;
ii: Switching between traffic dependent and SLA dependent TDD configurations.

A billing assignment may be improved as well by simply computing the allocated UL/DL slots per operator in a transmission frame.

The scheduling of resources by BS according to the aforementioned TDD configuration or the allocation of the resources for UL or DL may be semi-static in the sense that BS and UEs use one of the TDD configurations until a change of the resource allocation is required to meet the SLA. This way the UE is not required to request resources each transmission time interval, TTI, saving control plane overhead. On the other hand, dynamic scheduling may be used. In this case the TDD configuration or the allocation is dynamically adjusted by dynamically selecting one of the TDD configurations, for example after a predefined number of transmission time intervals passed. In an LTE environment, semi-static configuration or dynamic allocation of subframes may be used in LTE Time Division Duplex according to 3GPP TR 36.828 V11.0.0.

FIG. 2 depicts a corresponding device 200, e.g. BS, for allocating resources in radio communication system providing resources for uplink transmission and for downlink transmission for a plurality of operators providing a service to a user equipment via the radio communication system, wherein the device 200 comprises a processor 210, memory 220 and a transceiver 230, adapted to select a time division duplex configuration having an according allocation of uplink transmission time and/or an according allocation of downlink transmission time based on information regarding a sharing characteristic for the radio resources defined by a service level agreement between operators sharing the radio resource.

The transceiver 230 is adapted to communicate with the UEs UE1, ..., UE 30, via a radio communications link (not depicted in FIG. 2) in uplink and/or downlink connections. Therefore transceiver 230 comprises corresponding elements, e.g. buffers, antennas, etc., configurable as described above.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGS. 1 and 2, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, other diagrams and the like represent various processes which may be substantially represented in computer readable medium and so executed by a computer or processor, whether or not such computer or processor is explicitly shown.

At least parts of the above described radio communications network including sender or receiver could be implemented using network functions virtualization (NFV). NFV is a network architecture that makes use of technologies of computer virtualization. Entire network equipment like sender or receiver or parts thereof or part of their functions can be virtualized using software building blocks that may connect, or interact, to create communication services. A virtualized network function of e.g. a sender or receiver may include at least one virtual machine running different software and processes, on top of standard high-volume servers, switches and storage, or a cloud computing infrastructure, instead of having customized hardware appliances for each network function. As such a sender or receiver function may be implemented using a computer program product embodied on a non-transitory computer readable medium for performing operations, wherein the computer program product comprises instructions, that when executed by a processor, perform the operations of the specific BS or UE function.

The aforementioned device 200 may be configured as central unit integrated in a radio communication system for example at the level of the BS.

The central unit may be configured to coordinate a BS or a cluster of BS.

For example the aforementioned time division duplex configuration is obtained at the central unit by signaling exchange of information between the central unit and the SLAM. This means, that the information regarding the sharing characteristic for the radio resources is received at the central unit. In particular the time division duplex configuration is determined based on the received information regarding the sharing characteristic for the radio resource. Furthermore the allocation of uplink transmission time and/or the allocation of downlink transmission time may be stored centrally for the BS or all BS of the cluster of BS.

Additionally configuration data for a specific BS of the cluster of BS may be determined from the time division duplex configuration at the central unit.

Furthermore the configuration data may be sent by the central unit to any BS it affects.

In this case the respective BS may be adapted to receive the configuration data and to allocate uplink transmission time and/or downlink transmission time accordingly. In case the BS operates as the central unit, the configuration data may be provided via an internal interface.

This means that information for allocation of uplink transmission time and/or an allocation of downlink transmission time is selected based on the time division duplex configuration and the information for allocation of uplink transmission time and/or an allocation of downlink transmission time is processed for providing corresponding uplink and/or downlink radio resources at the device 200, e.g. in the processor 210, optionally in cooperation with the memory 220.

For example, device 200 is adapted to receive, e.g. via the transceiver 230, the information regarding the sharing characteristic for the radio resources, determine the time division duplex configuration based on the received information regarding the sharing characteristic for the radio resource, select information for an allocation of uplink transmission time and/or an allocation of downlink transmission time based on the time division duplex configuration.

Furthermore device 200 may be adapted to send, e.g. via the transceiver 230, information for an allocation of uplink transmission time and/or an allocation of downlink transmission time for processing at a unit providing corresponding uplink and/or downlink radio resources to the BS of the cluster controlled by device 200 as central unit.

Alternatively or additionally device 200 may be adapted to process, e.g. in the processor 210, optionally in cooperation with the memory 220, information for an allocation of uplink transmission time and/or an allocation of downlink transmission time, and provide corresponding uplink and/or downlink radio resources as well.

The invention claimed is:

1. A method comprising:
   selecting a time-division-duplex configuration from a plurality of time-division-duplex configurations having different allocations of uplink transmission time and/or allocations of downlink transmission time for subframes for individual ones of the time-division-duplex configurations, the selecting being based on information regarding a sharing characteristic for radio resources in a radio communication system providing radio resources for uplink transmission and for downlink transmission for a plurality of operators providing a service to a user equipment via the radio communication system; and
   allocating the radio resources in accordance with the selected time-division-duplex configuration,
   wherein at least one time-division-duplex configuration in the plurality of time-division-duplex configurations has at least one entire subframe within a time-division-duplex frame assigned to a specific operator of the plurality of operators and has at least one other entire subframe within the time-division-duplex frame assigned to another operator; and
   wherein an allocation among the different allocations of u link transmission time and/or an allocation among the different allocations of downlink transmission time according to the selected time-division-duplex configuration reflects a ratio or an absolute value regarding a resource split between at least the specific operator and the other operator.

2. An apparatus comprising:
   at least one processor; and
   at least one memory including computer program code, the at least one memory and the computer program code configured, with the at least one processor, to cause the apparatus to perform;
   selecting a time-division-duplex configuration from a plurality of time-division-duplex configurations having different allocations of uplink transmission time and/or allocations of downlink transmission time for individual ones of the time-division-duplex configurations, the selecting being based on information regarding a sharing characteristic for radio resources in a radio communication system providing radio resources for uplink transmission and for downlink transmission for a plurality of operators providing a service to a user equipment via the radio communication system; and
   allocating the radio resources in accordance with the selected time-division-duplex configuration,
   wherein at least one time-division-duplex configuration in the plurality of time-division-duplex configurations has at least one entire subframe within a time-division-duplex frame assigned to a specific operator of the plurality of operators and has at least one other entire subframe within the time-division-duplex frame assigned to another operator; and
   wherein an allocation among the different allocations of uplink transmission time and/or an allocation among the different allocations of downlink transmission time according to the selected time-division-duplex configuration reflects a ratio or an absolute value regarding a resource split between at least the specific operator and the other operator.

3. The method according to claim 1, wherein the selecting is made dynamically or semi-statically.

4. The method according to claim 1, wherein the selecting is made after a predetermined number of transmission time intervals, TTI, have passed since a previous selecting.

5. The method according to claim 1, wherein the selecting is deterministic.

6. The method according to claim 1, wherein at least one specific subframe of a time-division-duplex frame in the selected time-division-duplex configuration is assigned to the specific operator.

7. The method according to claim 1, wherein at least one transmission slot in one of the plurality of time-division-duplex configurations is configured to be scheduled for at least one user equipment of at least one of the plurality of operators considering a service level agreement of the at least one operator.

8. The method according to claim 1, wherein the configuration of at least one subframe of a time-division-duplex frame in one of the plurality of time-division-duplex configurations considers a number of active user equipment per operator in a radio cell.

9. The apparatus according to claim 2, wherein the selecting is made dynamically or semi-statically.

10. The apparatus according to claim 2, wherein the selecting is made after a predetermined number of transmission time intervals, TTI, have passed since a previous selecting.

11. The apparatus according to claim 2, wherein at least one specific subframe of a time-division-duplex frame in the selected time-division-duplex configuration is assigned to the specific operator.

12. The apparatus according to claim 2, wherein at least one transmission slot in a time-division-duplex configuration is configured to be scheduled for at least one user equipment of at least one of the plurality of operators considering a service level agreement of the at least one operator.

13. The apparatus according to claim 2, wherein the configuration of at least one transmission slot in one of the plurality of time-division duplex configurations considers a number of active user equipment per operator in a radio cell.

14. A computer program product comprising a non-transitory computer-readable storage medium bearing computer program code embodied therein for use with a computer, the computer program code comprising:
    code for selecting a time-division-duplex configuration from a plurality of time-division-duplex configurations having different allocations of uplink transmission time and/or allocations of downlink transmission time for individual ones of the time-division-duplex configurations, the selecting being based on information regarding a sharing characteristic for radio resources in a radio communication system providing radio resources for uplink transmission and for downlink transmission for a plurality of operators providing a service to a user equipment via the radio communication system; and
    code for allocating the radio resources in accordance with the selected time-division-duplex configuration, wherein at least one time-division-duplex configuration in the plurality of time-division-duplex configurations has at least one entire subframe within a time-division-duplex frame assigned to a specific operator of the plurality of operators and has at least one other entire subframe within the time-division-duplex frame assigned to another operator; and
    wherein an allocation among the different allocations of uplink transmission time and/or an allocation among the different allocations of downlink transmission time according to the selected time-division-duplex configuration reflects a ratio or an other operator.

15. The method according to claim 1, wherein the plurality of time-division-duplex configurations have one or more subframes for control information.

* * * * *